W. J. VANDERCAR.
ADVERTISING DEVICE FOR WEIGHING SCALES.
APPLICATION FILED FEB. 28, 1920.
1,346,923.
Patented July 20, 1920.
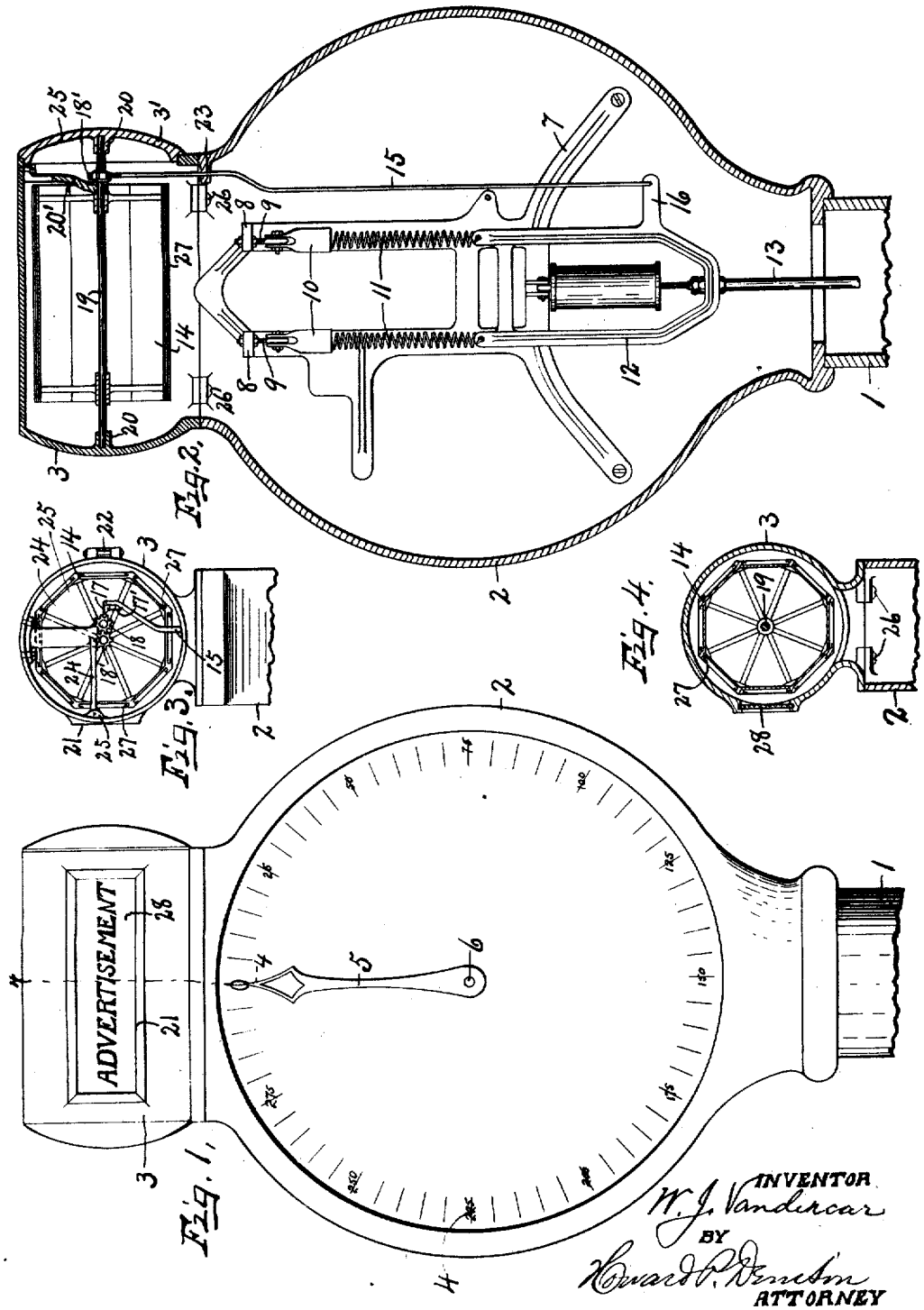

UNITED STATES PATENT OFFICE.

WILLIAM J. VANDERCAR, OF COHOES, NEW YORK, ASSIGNOR TO COLONIAL MACHINE COMPANY, INC., OF SYRACUSE, NEW YORK, A CORPORATION OF DELAWARE.

ADVERTISING DEVICE FOR WEIGHING-SCALES.

1,346,923.  Specification of Letters Patent.  Patented July 20, 1920.

Application filed February 28, 1920. Serial No. 362,081.

*To all whom it may concern:*

Be it known that I, WILLIAM J. VANDERCAR, of Cohoes, in the county of Albany, in the State of New York, have invented new and useful Improvements in Advertising Devices for Weighing-Scales, of which the following, taken in connection with the accompanying drawings, is a full, clear, and exact description.

This invention relates to certain improvements in advertising attachments for weighing scales, in which a suitable dial is mounted upon the upper end of an upright standard carried by a laterally projecting base upon which is mounted a platform which is mounted in any well known manner so as to have a slight vertical movement relatively to the base.

Suitable mechanism is also provided for transmitting motion from the movable platform to a rotary pointer which is movable around the dial, the latter being inclosed in a case for protection against injury.

The means for transmitting motion from the movable platform to the indicator or platform involves, in this instance, the use of a vertical reciprocatory frame within the dial case and connected to a main supporting frame by retracting springs for returning the movable parts to their normal positions with the pointer at the zero graduation of the dial.

The main object of my present invention is to provide the upper portion of the dial case with a supplemental case having a lengthwise opening in the front side thereof and adapted to contain a multi-sided rotary drum having advertising matter on each side and to provide suitable means operated by the vertical movable frame for rotating said drum step by step at each depression of the movable platform for successively presenting the sides of the drum containing the advertising matter to the opening in the front of the supplemental case, where it is easily visible to the operator of the platform.

Another object is to provide means for preventing the rotation of the drum in a reverse direction and for holding it in its adjusted position. A further object is to provide a supplemental drum with a movable end wall to permit the drum to be removed and replaced when necessary to change the advertising matter thereon or for any other cause.

In the drawings:

Figure —1— is a front elevation of the upper portion of a weighing scales showing my improved advertising device thereon.

Fig. —2— is a sectional view through the interior of the dial case and supplemental case and upper portion of the standard showing the vertical moving frame as retracting means, and also showing the connections between said frame and the advertising drum for rotating the latter step by step.

Fig. —3— is an end view of the supplemental case and drum and adjacent portion of the dial case, the movable end wall being open.

Fig. —4— is a transverse vertical sectional view taken on line 4—4, Fig. 1.

In order that my invention may be clearly understood, I have shown the upper portion of an upright column or standard —1— carrying at its upper end a dial case —2— which is adapted to receive and support a supplemental advertising case —3— above the dial, as —4—.

The column —1— is made of any desired height to permit the dial to be readily visible to the user when standing upon the platform, the lower end of the column being secured to any well known form of base projecting forwardly therefrom and carrying the usual platform which has a slight vertical movement and is mounted upon the usual supporting levers common in weighing scales of this character.

An indicator or pointer —5— is pivoted at —6— coaxial with the dial —4— to move around the graduations thereon, a main supporting frame —7— is secured to and within the dial case —2— and is provided near its upper end with forwardly projecting lugs —8— in laterally spaced relation for receiving a pair of adjustable anchor bolts —9— having pendent members —10— pivoted thereto; a pair of springs —11— are attached at their upper ends to the members —10— and have their lower ends attached to the opposite arms of a U-shaped frame —12— which is movable vertically and is adapted to be actuated by suitable connections between said vertical movable frame and the platform of the scales, said connections including, in this instance, a vertical movable rod —13— which is connected to the lower cross-bar of the U-shaped frame —12— and operates to draw said frame downwardly against the action of the retracting springs —11— when pressure is applied to the movable platform not shown.

The vertical movement of the frame —12— is utilized to operate a rotary advertising drum —14— through the medium of a push-rod —15— having its lower end attached to a laterally projecting arm —16— on the frame —12—, and its upper end provided with a pawl —17— for engagement with the teeth of a gear wheel —18— which meshes with a similar gear —18'— on one end of the drum —14—.

This drum is mounted upon a central shaft or spindle —19— which is journaled at its ends in suitable bearings —20— in the end walls of the supplemental case —3— at right angles to the plane of movement of the frame —12—, said drum being angular or multi-sided in cross-sections, in this instance, octagonal, and wholly within the supplemental case —3—. I prefer, however, to support the end of the drum nearest the movable end wall upon a supplemental bearing —20'— which is removably secured to and within the case —3— and upon which the gear or ratchet wheel —18— is journaled, thus permitting the end wall —3'— to be opened for the removal and replacement of the advertising cards without disturbing the drum.

The major portion of the case —3— is preferably circular in cross-section and is provided with an opening —21— in its front side, corresponding approximately in width and length to the length and width of one side of the drum —14—, one end of the case being fixed, while the other end, as —3'— is preferably hinged at —22— to permit it to be opened and closed for the removal and replacement of the drum —14— when desired. The pawl —17— is pivoted to the upper end of the push-rod —15— which is guided in a vertical opening —23— in one side of the dial case —2—, said pawl being free to ride over the teeth of the gear against the action of a light retracting spring —17'— as the rod —15— is drawn downwardly and to engage said teeth to rotate the drum one tooth space at each upward movement of the frame —12— by the springs —11— to avoid extra load upon the weighing scales.

The number of teeth in the ratchet wheel —18— preferably correspond to the number of sides of the drum —14— and are proportionate as to length to correspond to the movement of the frame —12— so that at each upward movement of said frame, the pawl —17— will rotate the drum one tooth space to successively register its several sides with the opening —21—, each side of the drum being provided with such advertising matter as it may be desired to display through said opening.

A detent —24— is pivoted at one end to a lug —25— on the case —3— and has its other end adapted to engage the teeth of the ratchet wheel —18— to prevent reverse movement of the drum after each operation by the pawl —17—.

The supplemental case —3— is preferably made separate from the dial case —2—, but is secured thereto by screws —26— when their parts are assembled for use, the opening in the front side of the case —3— being closed by a glass or other transparent plate —27— to permit the advertising matter on the registering side of the drum to be easily read therethrough by the operator standing upon the platform of the scales.

Each side of the drum —14— is provided with opposite grooves or ways —27— into which the card or other member bearing advertising matter may be readily inserted and which serve to retain said card or plate in operative position, while, at the same time, permitting its endwise removal and replacement by other cards when necessary or desirable.

It has not been deemed necessary to show the platform and mechanism for transmitting motion therefrom to the draw-rod —13—, for the reason that such mechanism is well understood by those skilled in the art, and, in like manner, any suitable mechanism may be employed for transmitting motion from the movable frame —12— to the pointer —5— because such mechanism does not form a part of my present invention.

What I claim is:

1. In a weighing scale of the character described, the combination of a dial case, a supplemental case mounted upon the top of the dial case and provided with an opening in one side, and also having a movable end wall to permit access to the interior thereof, a vertical reciprocatory frame within the dial case, a drum rotatably mounted within the supplemental case and movable across said opening, a ratchet wheel on one end of the drum, a pawl engaged with the ratchet wheel and a rod connecting the movable frame with said pawl to cause the rotation of the drum step by step one tooth space at a time at each successive movement of the frame in one direction.

2. In a weighing scale of the character described, the combination of a dial case, a dial in the front side thereof, a vertical reciprocatory frame movable within the dial case, a supplemental case secured to the top of the dial case and provided with an opening in its front side, a multi-sided equilateral drum rotatably mounted within the supplemental case and having its sides movable across and in close proximity to the opening therein, means actuated by successive movements of said frame in one direction for rotating the drum step by step to successively present the several sides to said opening, and means for preventing a reverse movement of the drum.

In witness whereof I have hereunto set my hand this 17th day of December, 1919.

WILLIAM J. VANDERCAR.

Witnesses:
JOHN W. KEEFE,
GEO. W. ANDREW.